US00H002053H

(19) United States

(12) Statutory Invention Registration

Cunnane, III

(10) Reg. No.: US H2053 H

(43) Published: Dec. 3, 2002

(54) SHAPED YARNS FOR USE IN PAPERMAKING FABRICS

(75) Inventor: Francis J. Cunnane, III, Mt. Pleasant, SC (US)

(73) Assignee: AstenJohnson, Inc., Charleston, SC (US)

(21) Appl. No.: 09/772,494

(22) Filed: Jan. 30, 2001

(65) Prior Publication Data

US 2002/0100572 A1 Aug. 1, 2002

(51) Int. Cl.[7] ..... D21F 1/10

(52) U.S. Cl. ..... 162/348

(58) Field of Search ..... 162/348, 358.2, 162/900, 902, 903; 139/383 A; 428/105, 109, 222, 224, 225, 234, 398

(56) References Cited

U.S. PATENT DOCUMENTS 5,100,713 A * 3/1992 Homma et al. ..... 428/102

5,368,696 A * 11/1994 Cunnane, III et al. ... 162/358.2

* cited by examiner

*Primary Examiner*—Michael J. Carone

*Assistant Examiner*—M. Thomson

(74) *Attorney, Agent, or Firm*—Volpe and Koenig, P.C.

(57) ABSTRACT

A papermaking fabric with increased stability is provided, due to the use of beam construction yarns which resist lateral, vertical and torsional deflection as well as compression when interwoven. The yarns are generally non-circular in cross-section and are preferably I-beam, H-beam, box-beam or a hybrid construction. Each type has certain advantages, with the hybrid construction being capable of multiple combined advantages.

1 Claim, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SHAPED YARNS FOR USE IN PAPERMAKING FABRICS

BACKGROUND

The present invention is directed to papermaking fabrics having shaped yarns, and more particularly to papermaking fabrics made with structural yarns shaped for enhanced lateral, vertical and torsional stability.

Papermaking fabrics are subjected to harsh environments through every stage of the papermaking process. Forming fabrics are exposed to high moisture and caustic chemicals in the forming section as the paper web is formed on the fabric surface. Press fabrics are also exposed to high moisture and high contact pressure in the nip between press rolls in the press section where the paper web is de-watered. Dryer fabrics are subject to both high heat and humidity in the dryer section as the paper web is dried to form the final paper product. All of these papermaking fabrics must maintain dimensional and structural stability throughout the fabric life in order to support the paper web. Movement through the various machine rolls causes a great potential for lateral (Y), vertical (Z) or torsional (rotation) displacement of circular yams typically used in papermaking fabrics.

Traditionally, papermaking fabrics were woven with yarns having circular cross-sections. Their uniform shape negated worries about rotational distortion-except for twist problems. These yarns, however, were subject to lateral displacement where one yarn slides toward another yarn, creating an open area and a bunched area, rather than uniform contact and open areas. The fabric therefore suffered from lack of control of contact surface area and permeability.

To combat lateral displacement of structural yarns, shaped yarns (such as I, U or X-shaped yarns) have been used to cradle structural yarns to lessen the amount of displacement relative to one another in multilayer fabrics. Yarns having X or Y shapes or otherwise having flexible leg portions have been used in the weft position to enhance permeability control and for stabilization against distortion. Shaped yarns have also been used as stuffer yams to fill voids in spiral fabrics to reduce the fabric permeability.

A common theme with the prior known shaped yarns is that they deform during the weaving process to lock themselves into position. In the deformed shape, these yarns are more stable and also act to stabilize the cross-direction yarns. This is seen in both hollow and shaped yarns. Many of these shaped yarns (X, I, H, Y) as well as hollow yams accomplish goals of increased stability, reduced displacement and permeability control. However, they do not directly address lateral, vertical and torsional displacement in the structural yarns of a papermaking fabric.

It would be desirable to provide a papermaking fabric which will withstand the ravages of a papermaking machine and resist lateral, vertical and torsional displacement.

SUMMARY

Generally, the present invention is a papermaking fabric which has increased stability due to the use of beam construction yarns which resist lateral, vertical and torsional deflection as well as compression, when interwoven as structural yams. The yarns are generally non-circular in cross-section and are preferably I-beam, H-beam, box-beam, or a hybrid construction. Each type has certain advantages and disadvantages with the hybrid construction being capable of multiple combined advantages.

BRIEF DESCRIPTION OF THE DRAWINGS

The foregoing summary, as well as the following detailed description of the preferred embodiments of the invention, will be better understood when read in conjunction with the appended drawings. For the purpose of illustrating the invention, there is shown in the drawings embodiments which are presently preferred. However, it will be understood by those skilled in the art from the present disclosure that the invention is not limited to the precise arrangements shown. In the drawings.

DETAILED DESCRIPTION OF THE PREFERRED EMBODIMENT

Figure 1:
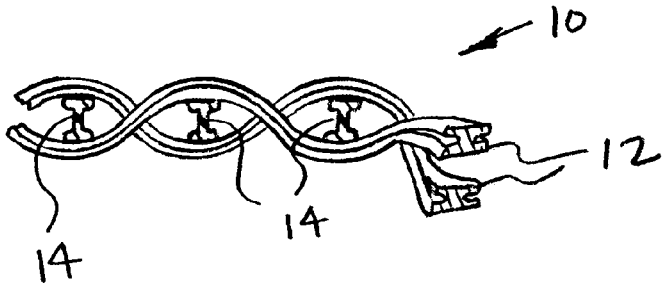
FIG. 1 is a cross-sectional view of a portion of a papermaking fabric having I-beam cross-machine direction yarns and H-beam, machine direction yarns.

Certain terminology is used in the following description for convenience only and is not limiting: "right," "left," "lower" and "upper" designate directions in the drawings to which reference is being made. The terminology includes the words specifically noted above as well as derivatives thereof and words of similar import. Additionally, the words "a," "and" and "one" are understood to mean one or more of the designated items unless specifically noted.

Referring now to FIG. 1, a portion of a papermaking fabric 10 is shown. The papermaking fabric includes machine direction yarns 12 and cross-machine direction yarns 14. The machine direction yarns 12 have an H-shaped cross-section to provide a high contact area and good Z-direction (vertical) stiffness. The machine direction yarns also have exceptional Y-direction (lateral) stiffness, due to the width of the upper and lower flanges.

Preferably, the cross-machine direction yarns 14 have an I-beam shaped cross-section, having extremely high bending stiffness in the Z-direction. I-beams also provide moderate Y-direction and torsion resistance.

The machine direction and cross-machine direction yarns 12 and 14 are preferably extruded monofilament yarns extruded in the known manner, as will be understood as those skilled in the art. The yarns may be drawn and quenched, depending upon the properties desired. The fabric 10 is shown as having a plain weave. However, it will be recognized by those skilled in the art for under present disclosure that the weave can be any desired weave, such as a crows foot or sateen, if desired.

Figure 2:
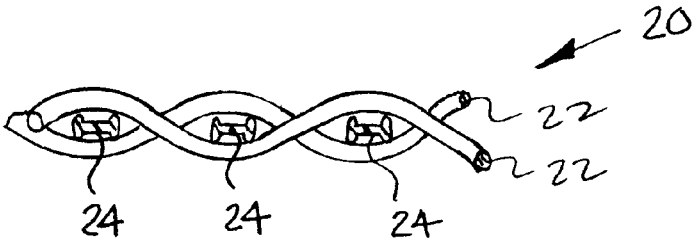
FIG. 2 is a cross-section of a portion of a papermaking fabric in accordance with a second embodiment of the present invention having I-beam cross-machine direction yarns.

Referring now to FIG. 2, a portion of a second embodiment of a papermaking fabric 20 is shown. The fabric 20 includes machine direction yarns 22 and cross-machine direction yarns 24. The cross-machine direction yarns 24 are preferably I-beam shaped yarns having the central web oriented generally horizontally. This provides a fabric with increased strength, stiffness and a lower caliper. The machine direction yarns 22 are shown as monofilaments having a circular cross-section. However, it will be recognized by those skilled in the art from the present disclosure that the machine direction yarns 22 could have any other desired cross-sectional shape, depending upon the properties desired. Preferably the machine direction and cross-machine direction yarns 22, 24 are extruded in the known manner.

Figure 3:
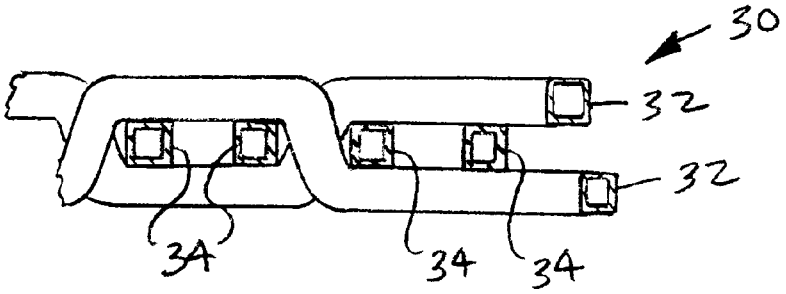
FIG. 3 is a cross-section of a portion of a papermaking fabric having box-beam machine direction and cross-machine direction yarns.

Referring now to FIG. 3, a portion of a third embodiment of a papermaking fabric 30 is shown. The fabric 30 includes machine direction yarns 32 and cross-machine direction yarns 34. Preferably, both the machine and cross-machine direction yarns 32 and 34 have a generally boxed-shaped cross-section with a hollow center. This construction provides good contact area and stiffness in the lateral and vertical directions to provide a high stability, high contact fabric having a low mass, due to the use of hollow yarns 32, 34. The box-beam configuration also provides exceptional torsion resistance in order to maintain excellent fabric dimensional stability. While the portion of fabric shown has a two-over, two-under weave, it will be recognized by those skilled in the art from under present disclosure that other weave patterns can be used, if desired.

Figure 4:
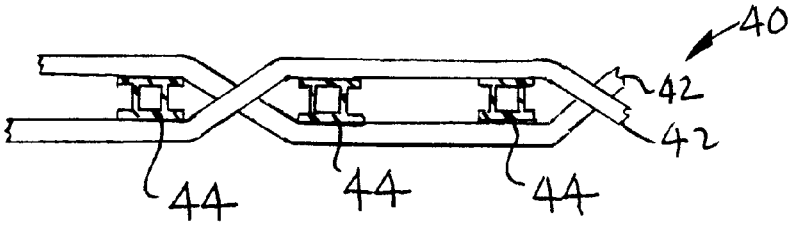
FIG. 4 is a cross-section of a portion of a papermaking fabric in accordance with a fourth embodiment of the present invention having hybrid box-beam cross-machine direction yarns.

Referring now to FIG. 4, a fourth embodiment of a fabric 40 is shown. The fabric 40 has machine direction yarns 42 and cross-machine direction yarns 44. The machine direction yams 42 are illustrated as monofilaments having a circular cross-section. The cross-machine direction yarns are preferably a hybrid cross-section, combining the box-beam and the H-beam to provide a high contact area, good Z-direction (vertical) and Y-direction (lateral) stiffness, as well as exceptional torsion resistance. Preferably the machine direction and cross-machine direction yarns are extruded monofilaments which are extruded in the known manner. The materials used for the yarns can be PET, PA, polyethylene or any other desired material, depending upon the properties required.

It will be recognized by those skilled in the art from the present disclosure that the fabric embodiments 10, 20, 30, and 40, as shown above, are merely exemplary and that other configurations could be used to provide fabrics with increased stability due to the use of interwoven structural yarns which preferably have I-beam, H-beam, box-beam and/or hybrid cross-sections. It will be similarly recognized that the woven fabrics 10, 20, 30 and 40 can be used as forming fabrics or as base materials for press or dryer fabrics, with batting being needled or adhered to the base fabric, if desired.

It will therefore be understood by those skilled in the art from the present disclosure that changes could be made to the preferred embodiments described above without departing from the broad inventive concept thereof. Accordingly, the present invention is not limited to the particular embodiments disclosed, and is intended to cover modifications within the spirit and scope of the present invention.

What is claimed is:

1. Papermaking fabric comprising interwoven machine direction and cross-machine direction yarns, at least one of the machine direction and cross-machine direction yarns comprising a structural yarn having a non-circular cross-section selected from one of an I-beam, an H-beam, a box-beam and a hybrid construction. rn

* * * * *